United States Patent
Inoue et al.

[19]

[11] Patent Number: 5,982,535
[45] Date of Patent: Nov. 9, 1999

[54] CENTRIFUGE MICROSCOPE CAPABLE OF REALIZING POLARIZED LIGHT OBSERVATION

[75] Inventors: Shinya Inoue, Falmouth, Mass.; Keisuke Suzuki, Yokohama, Japan; Koji Ichie, Nagoya, Japan; Chikara Nagano, Hino, Japan; Naobumi Okada, Asaka, Japan; Hajime Takahashi, Hachioji, Japan

[73] Assignees: Marine Biological Laboratory, Woods Hole, Mass.; Olympus Optical Co., Ltd., Tokyo; Hamamatsu Photonics K.K., Hamamatsu, both of Japan

[21] Appl. No.: 08/908,220

[22] Filed: Aug. 7, 1997

[51] Int. Cl.⁶ .............................. G02B 21/26; G02B 21/00
[52] U.S. Cl. ........................... 359/394; 359/368; 359/371
[58] Field of Search .................................. 359/363, 900, 359/268–372, 385–390, 393–395

[56] References Cited

U.S. PATENT DOCUMENTS 1,907,803   5/1933  Harvey et al. .......................... 359/394
4,063,804  12/1977  Hellwarth et al. ...................... 359/371
4,756,611   7/1988  Yonekubo et al. ...................... 359/371
5,022,743   6/1991  Kino et al. ............................... 359/368

FOREIGN PATENT DOCUMENTS

63-250615  10/1988   Japan .

Primary Examiner—Thong Nguyen
Attorney, Agent, or Firm—Frishauf, Holtz, Goodman & Chick, P.C.

[57] ABSTRACT

A centrifuge microscope includes a disk which is rotatable around a rotation axis and which is provided with a sample chamber for accommodating a sample. An observation optical system is provided which includes an objective lens which is positioned such that the sample chamber crosses an optical axis of the objective lens as the disk rotates. A pulsed laser source is provided for emitting a pulsed laser to the sample at a timing at which the sample chamber crosses the optical axis of the objective lens. And a delay time adjusting section is provided for adjusting a delay time of an emission timing of the pulsed laser in accordance with a rotational speed of the disk.

9 Claims, 7 Drawing Sheets

CENTRIFUGE MICROSCOPE CAPABLE OF REALIZING POLARIZED LIGHT OBSERVATION

BACKGROUND OF THE INVENTION

The present invention relates to a centrifuge microscope capable of observations in polarized light while applying a centrifuge force on the sample and observation methods performed using the centrifuge microscope.

Conventionally, centrifuge microscopes have been used for observing a sample while applying a centrifuge force by rotating a table on which the sample is placed at a high speed. An example of such centrifuge microscope is disclosed in the Jpn. Pat. Appln. KOKAI No. 63-250615. In the disclosed centrifuge microscope, a sample chamber in a rotor is arranged across the optical axis between a condenser lens and an objective lens. With the sample chamber rotating, the sample is illuminated with a pulsed light source. Since the transmitted light of the sample is accepted by the objective lens, a stationary observed image can be obtained regardless of the rotation of the sample chamber.

In the above mentioned disclosure, a stroboscope is used as the pulsed light source to illuminate the sample. The emission timing of the stroboscope is synchronized with the rotation of the rotor so that the emission takes place only when the sample chamber is on the optical axis between the condenser lens and the objective lens. In order to obtain a stationary image regardless of the rotation of the sample chamber, the emission time of the stroboscope needs to be sufficiently short. Otherwise, the observed image is blurred and provides low resolution.

Therefore, in the above-mentioned centrifuge microscope, in order to obtain stable stationary images even in the case where the emission time of the stroboscope cannot be sufficiently short, a parallel glass plate is provided between the objective lens and the rotor. The parallel plate is arranged orthogonally to the optical axis of the objective lens, and supported to be rotatable around an axis perpendicular to the tangent of the rotation of the sample chamber. The glass plate is tipped in synchronism with the rotation of the rotor in order to deviate the optical path such that the optical axis of light emitted from the sample in the sample chamber is always coincident with the optical axis of the objective lens. Accordingly, a bright image can be observed with good resolution without being blurred.

Conventionally, the following method is considered. For example, when the weakly birefringent mitotic spindle contained among highly birefringent yolk granules in an egg cell is observed as a sample in studies on cell division, the yolk granules with larger specific gravity are separated from the spindle with a centrifuge and the spindle is observed with a polarized light microscope after the cell is removed from the centrifuge. In this method, the percentage of centrifugally fragmented (yet viable) egg cells, containing spindles separated and gathered free from the yolk with the centrifuge, is less than 1%. Besides, since the specimen needs to be taken out from the centrifuge for observation, the yolk and the spindles co-mingle again, and thus it has been impossible to observe only the spindles with a polarized light microscope.

On the other hand, one can consider a method of enabling the imaging and measurement of the weak birefringence retardance, which reflects the concentration or the molecular orientation of microtubules comprising the spindles, with the specimen lying with in the centrifugal field, so as to separate yolk which has a larger specific gravity, using a centrifuge microscope. Observation of the specimen under centrifugal force would also provide a tool for studying the mechanism of cell division such as the measurement of the interaction between the chromosomes and the microtubules. However, observation of molecular orientation in the spindles, and visualization of the spindle fibers attached to the chromosmes, can be achieved only with a polarized light microscope capable of imaging weakly retarding objects, and the polarized light observation cannot be realized with a conventional centrifuge microscope.

In the case of conducting polarized light observation with the above-mentioned conventional centrifuge microscope, the parallel plate which is inserted between the objective lens and the rotor, for alleviating the conditions of emission time of the stroboscope, causes deterioration of polarizing characteristics in the polarized light observation, and thus effective polarized light observation cannot be conducted. Besides, in the case a xenon lamp or a flash lamp is used as the light source of the stroboscope, the quantity of light necessary for polarized light observation of weakly retarding objects cannot be provided and thus the polarized light observation cannot be achieved.

In addition, when an observation is conducted with the emission timing of the stroboscope synchronized with the rotation of the rotor, as the rotation speed of the rotor is changed the emission of the stroboscope and the rotation of the rotor can become out of synchronization so as to generate blurring in the observed image.

For the above-mentioned reasons, a centrifuge microscope capable of polarized light observation of weakly birefringent objects has so far not been available.

BRIEF SUMMARY OF THE INVENTION

An object of the present invention is to provide a centrifuge microscope capable of realizing polarized light observation, and systems for observation with the centrifuge microscope.

The centrifuge microscope of the present invention comprises a disk which is rotatable around a rotation axis and provided with a sample chamber for accommodating a sample. An optical system for observation is provided with an objective lens which is positioned in a manner such that the sample chamber crosses the optical axis of the objective lens during rotation of the disk. A pulse laser source is provided for emitting a pulsed laser beam to the sample at a timing at which the sample chamber crosses the optical axis of the objective lens, and a delay time adjusting section is provided for adjusting a delay time of an emission timing of the pulsed laser beam in accordance with the rotational speed of the disk.

An observation method performing using the centrifuge microscope of the present invention comprises a step of rotating a disk arranged to be rapidly rotatable around a stable axis and provided with a sample chamber for accommodating a sample, and a step of polarized light observation of the sample through the objective lens at the time the sample chamber coincides with the optical axis of the objective lens while applying centrifugal force to the sample according to the rotation of the disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
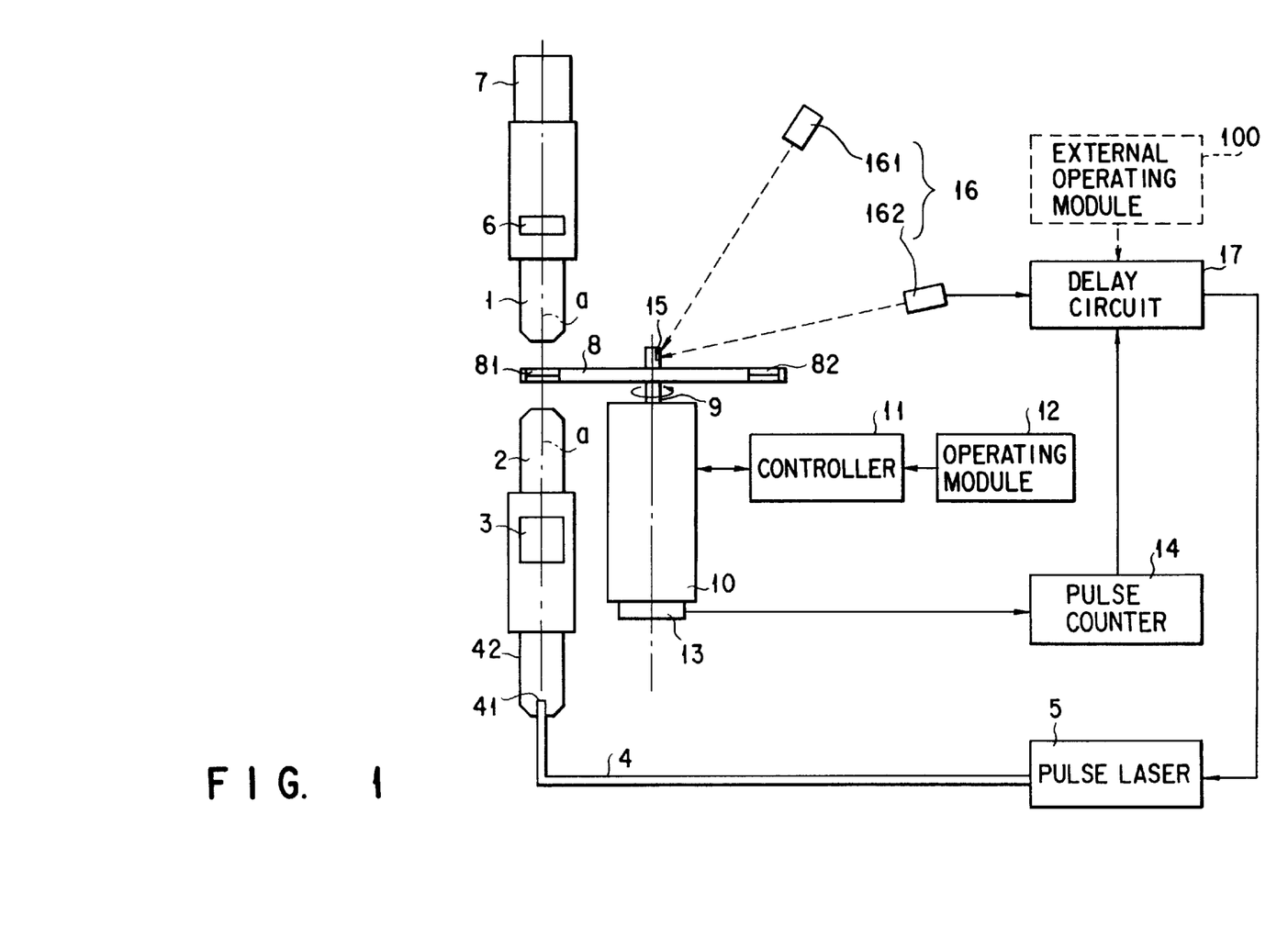
FIG. 1 is a diagram illustrating the configuration of a centrifuge microscope according to the first embodiment of the present invention.

FIG. 1 is a diagram illustrating the configuration of a centrifuge microscope of the first embodiment. The centrifuge microscope of FIG. 1 comprises an optical system for transmission polarized light observation. In FIG. 1, an objective lens 1 and a condenser lens 2 are arranged with their optical axes coincident. On the optical axis (a) of the condenser lens 2 are a polarizer 3, a beam expander 42, and a light output end 41 of an optical fiber 4, whose other end is connected with a pulsed laser 5. Further, an analyzer 6 and a CCD, or other video or photographic, camera 7 are arranged on the optical axis a of the objective lens 1. Accordingly, an optical system for transmission polarized light observation is provided. In this case, a pulsed laser 5 having a short pulse width and little bitter, capable of ensuring a high output, such as an Nd (Neodymium): YAG/YLF laser, an Nd:KGW chamber laser, an Nd:glass laser, a nitrogen/dye laser, a dye laser, and a wavelength changeable solid state laser is used.

A disk 8 is arranged in a space between the objective lens 1 and the condenser lens 2. The disk 8 is supported by a stable rotation axis 9 and driven by a motor 10 (for example, air spindle) through the rotation axis 9. A sample chamber 81 for accommodating a sample (not illustrated) is provided at a peripheral portion of the disk 8. The sample chamber 81 comes across the optical axis a between the objective lens 1 and the condenser lens 2 according to the rotation of the disk 8. The disk 8 may also be provided with a sample chamber 82 for dummy at the opposite end of the sample chamber 81 in the peripheral portion with respect to the rotation center, that is, the rotation axis 9. By incorporating a pair of sample chambers 81 and 82 on the disk 8 symmetrically with respect to the center of rotation, the rotational stability of the disk 8 driven at high speed can be ensured.

A controller 11 is connected to the motor 10 for driving the disk 8. The controller 11 can change the rotational speed of the motor 10 according to the instruction of the user through an operating module 12. The motor 10 is provided with an encoder 13, which is connected to a pulse counter 14. The encoder 13 generates a rectangular wave each time the motor 10 is oriented at a predetermined angle. The pulse counter 14 inputs the rectangular wave output from the encoder 13 so as to calculate the rotational speed of the disk 8 by counting the number of the rectangular waves as well as adjusting the delay amount of a delay circuit 17 later described based on the calculation result.

Figure 7:
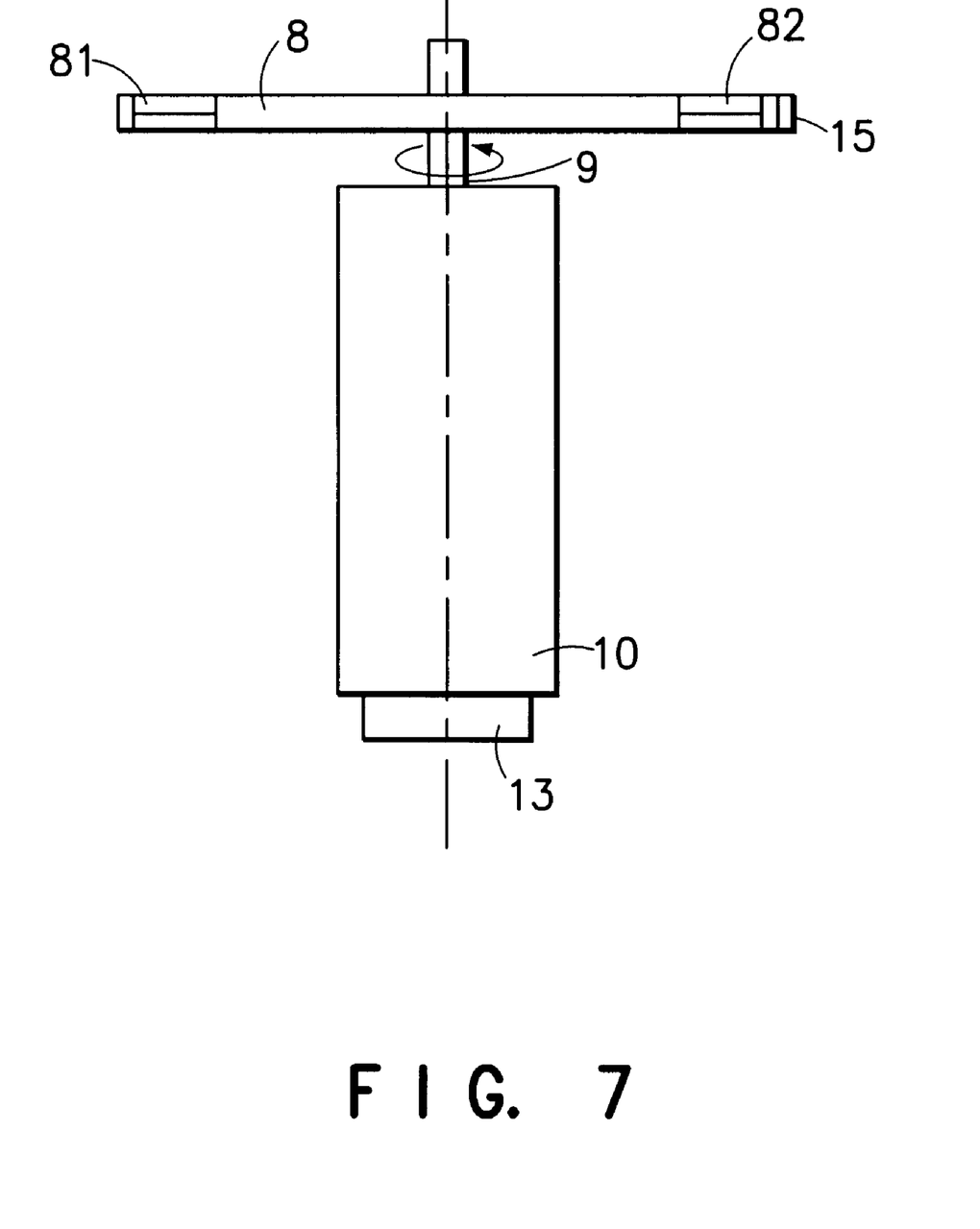
FIG. 7 shows an alternative arrangement of several components of the centrifuge microscope.

A mirror 15 is provided at the edge of the rotation axis 9 that supports the disk 8, with the mirror surface arranged towards a certain direction. The mirror 15 can be placed on any portion of the rotation axis 9 or the disk 8, as shown in FIG. 7. A position detection portion 16 comprising a laser diode (LD) 161 and a photo detector (PD) 162 is arranged in correspondence with the mirror 15. The position detecting portion 16 directs a laser beam from the laser diode 161 to the mirror 15 as well as receives a reflected light from the mirror 15 at the photo detector 162. The photo detector 162 receives reflected light from the mirror 15 whenever the disk 8 takes on a certain orientation, so as to generate a pulse to indicate the passage of the certain orientation and, to provide output to the delay circuit 17 when the sample chamber 81 of the rotating disk 8 passes across the optical axis.

The photo detector 162 of the position detecting portion 16 is connected with the delay circuit 17. The delay circuit 17 generates a signal for indicating a delay time later described at a certain time after inputting a pulse output from the photo detector 162, and outputs the signal toward the pulsed laser 5 as the trigger signal for emitting the pulsed laser. The delay circuit 17 can adjust the length of the delay amount, that is, the delay time based on a signal input from the pulse counter 14.

If the pulse width of a laser beam generated from the pulsed laser 5 widens, an observed image farther from the optical axis a is picked up by the CCD camera so as to blur the observed image and deteriorate the resolution. Therefore, by setting the pulse width according to the resolution of the objective lens 1 as mentioned below, a high resolving power can be obtained at the observation system. That is, with numerical aperture of the objective lens: NA
laser wavelength: $\lambda$ [$\mu$m]
laser pulse width: h [nsec]

rotation radius of the sample: R [mm]

maximum rotation speed of the sample: N [rpm], the resolution Δ of the objective lens 1 can be represented by the below-mentioned formula (1) from the Rayleigh's formula:

$$\Delta = 0.61 \times \lambda / NA \qquad (1)$$

The blurring of the observed image according to the emission period of the laser beam is represented by the below-mentioned formula (2):

$$\begin{aligned}
\text{(rotation speed of the sample)} \times \text{(laser emission period)} &= \text{(rotation speed of the sample)} \times \text{(pulse width)} \\
&= (2\pi R \times 10^3 \times N/60) \times h/10^9 \\
&= ((2\pi R \times N/60) \times h)/1000000 \, [\mu m].
\end{aligned} \qquad (2)$$

In the case the blurring of the observed image is less than the resolution of the objective lens 1, the resolution of the observation system is not deteriorated, and thus the pulse width of a laser beam generated from the pulsed laser 5 is set in a range satisfying the below-mentioned formula (3):

$$h \leq (0.61 \times \lambda / NA / (2\pi R \times N/60)/1000000) \qquad (3).$$

The operation of the centrifuge microscope with the above-mentioned configuration will be explained. The user places a sample to be observed in the sample chamber 81 in disk 8. Then the user instructs the rotation speed of the motor 10 through the operating module 12. The controller 11 drives the motor 10 according to the rotation speed. The motor 10 rotates the disk 8 around the rotation axis 9 at the rotation speed. A laser beam is emitted from the pulsed laser 5 at the time the sample chamber 81 of the disk 8 comes across the optical axis a between the objective lens 1 and the condenser lens 2 as later described. The laser beam reaches the polarizer 3 from the optical fiber 4 so as to be polarized by the polarizer 3 and passes through the sample in the sample chamber 81 via the condenser lens 2. Furthermore, the laser beam transmitted by the sample reaches the CCD camera 7 through the analyzer 6 via the objective lens 1. Accordingly, the observed polarized light image of the sample is picked up by the CCD camera 7.

Figure 2A:
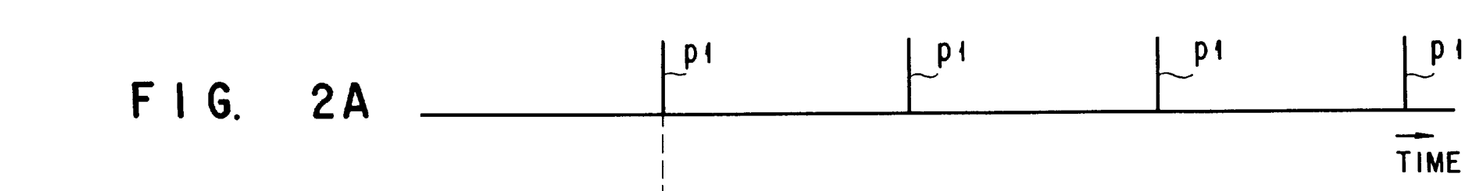
FIG. 2A is a diagram illustrating the desired emission timing of a pulse laser.
Figure 2B:
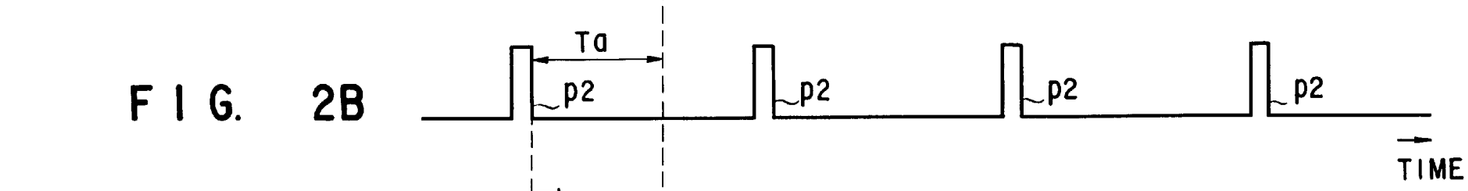
FIG. 2B is a diagram illustrating the timing a pulse generated by the position detector.

FIGS. 2A to 2D are diagrams explaining the laser emission timing of the pulsed laser 5. FIG. 2A describes the timing at which a certain position of the disk 8, that is, the sample chamber 81 comes across the optical axis a between the objective lens 1 and the condenser lens 2 at a desired time point p1. At the timing shown by FIG. 2B, a pulse p2 is output from the photo detector 162 of the position detecting portion 16. In this case, in the position detecting portion 16, a laser beam is directed from the laser diode 161 to the mirror 15 arranged facing a certain direction of the rotation axis 9 that supports the disk 8. Then after the photo detector 162 receives reflected light from the mirror 15, a pulse synchronized (but out of phase) with the timing at which the sample chamber 81 passes the optical axis a between the objective lens 1 and the condenser lens 2 is output from the photo detector 162.

Figure 2C:
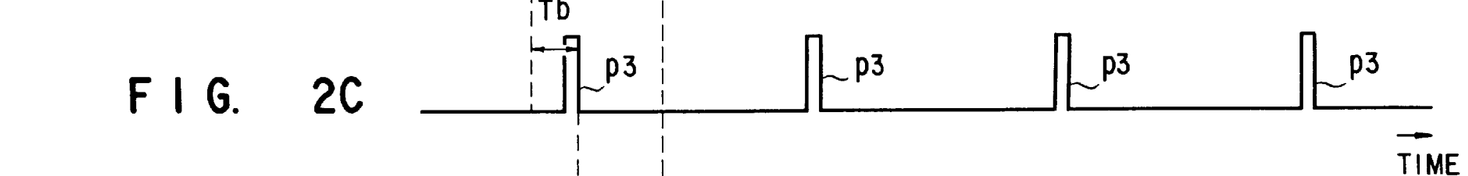
FIG. 2C is a diagram illustrating the output pules from the delay circuit.

The delay circuit 17 inputs the pulse output from the photo detector 162. As shown in FIG. 2C, the delay circuit 17 outputs a pulse p 3 delayed from the pulse output from the photo detector 162, that is, the pulse p2 shown in FIG. 2B, by a certain time Tb as the trigger signal for the pulsed laser 5. The delay time Tb is determined by an intrinsic delay time preliminarily set in the delay circuit 17 and the delay amount sought by the rotation speed of the disk 8 counted by the pulse counter 14.

Figure 2D:
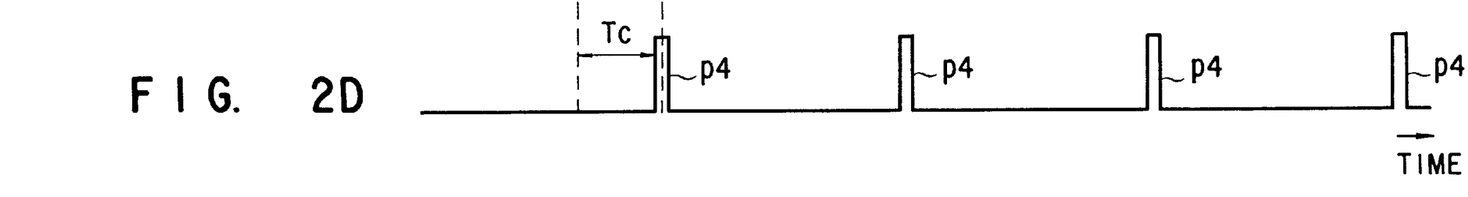
FIG. 2D is a diagram illustrating the emission timing of a pulse laser.

After input of the trigger signal (p3) that has the delay time Tb output from the delay circuit 17, the pulsed laser 5 emits a laser beam as shown in FIG. 2D at the timing shown by a pulse p4 after an interval of time Tc passes from the trigger signal. The time interval Tc is the time needed for the laser emission from the pulse laser 5, and thus it is constant regardless of the rotational speed of the disk 8.

Accordingly, after the time Ta passes from the output of the pulse p2 from the photo detector 162 of the position detecting portion 16, a laser beam is emitted from the pulsed laser 5 with the timing at which the sample chamber 81 comes across the optical axis a between the objective lens 1 and the condenser lens 2, that is, the timing being the same as the time point p1. Namely, a laser beam is emitted from the pulsed laser 5 delayed by the certain time Ta from the pulse output from the photo detector 162 output per every one rotation of the disk 8. Accordingly, the timing of the laser emission from the pulsed laser 5 becomes coincident with the timing of the sample chamber 81 coming across the optical axis a between the objective lens 1 and the condenser lens 2.

The time Ta becomes shorter as the rotation speed of the disk becomes faster, whereas the time Ta becomes longer as the rotation speed becomes slower. Therefore, for example, if when the disk 8 rotates at 1000 rpm the timing of the sample chamber 81 passing the optical axis a between the objective lens 1 and the condenser lens 2 and the timing of the laser beam emission from the pulsed laser 5 coincide, when the rotation of the disk 8 becomes, for example, 1200 rpm or more, the timings could not coincide any more as long as the value of the time Ta remains the same.

However, since the rectangular wave output from the encoder 13 present in the motor 10 changes when the rotational speed of the disk 8 changes, the delay amount of the delay circuit 17 is adjusted at the pulse counter 14 based on the rotation speed of the disk 8 based on the input from the encoder 13. Accordingly, the delay time Tb of the delay circuit 17 is changed so that the laser beam emission timing from the pulsed laser 5 coincides with the timing that the sample chamber 81 passes the optical axis a between the objective lens 1 and the condenser lens 2 again.

The laser pulse width from the pulsed laser 5 derived from the above-mentioned formula (3) becomes the below-mentioned formula (4) with a concrete example of:

numerical aperture of the objective lens: NA=0.4 (20 times)

laser wavelength: Δ=0.532 ($\mu$m)

rotation radius of the sample: R=80 (mm)

maximum rotation speed of the sample: N=12000 (rpm)

$$h \leq (0.61 \times \lambda / NA)/((2\pi R \times N/60)/1000000) = 8.1$$

Accordingly, a pulsed laser 5 with the pulse width h=5 [nsec] needs to be used. In this case, the resolution Δ of the objective lens 1 can be represented by the below-mentioned formula (5):

$$\Delta = 0.61 \times \lambda / NA = 0.81 \ (\mu m) \quad (5).$$

The amount of the sample's movement during the laser emission period (exposure time) is determined by the pulse width, that is, the blurring of the observed image s is represented by the below-mentioned formula (6):

(rotation speed of the sample)×(laser emission period)=$((2\pi R \times N/60/1000000) \times h = 0.5 \ (\mu m)$ (6).

Therefore, the blurring of the observed images becomes less than the resolution of the objective lens 1, and thus microscope observation can be conducted without deteriorating the resolution of the observation system.

Figure 3:
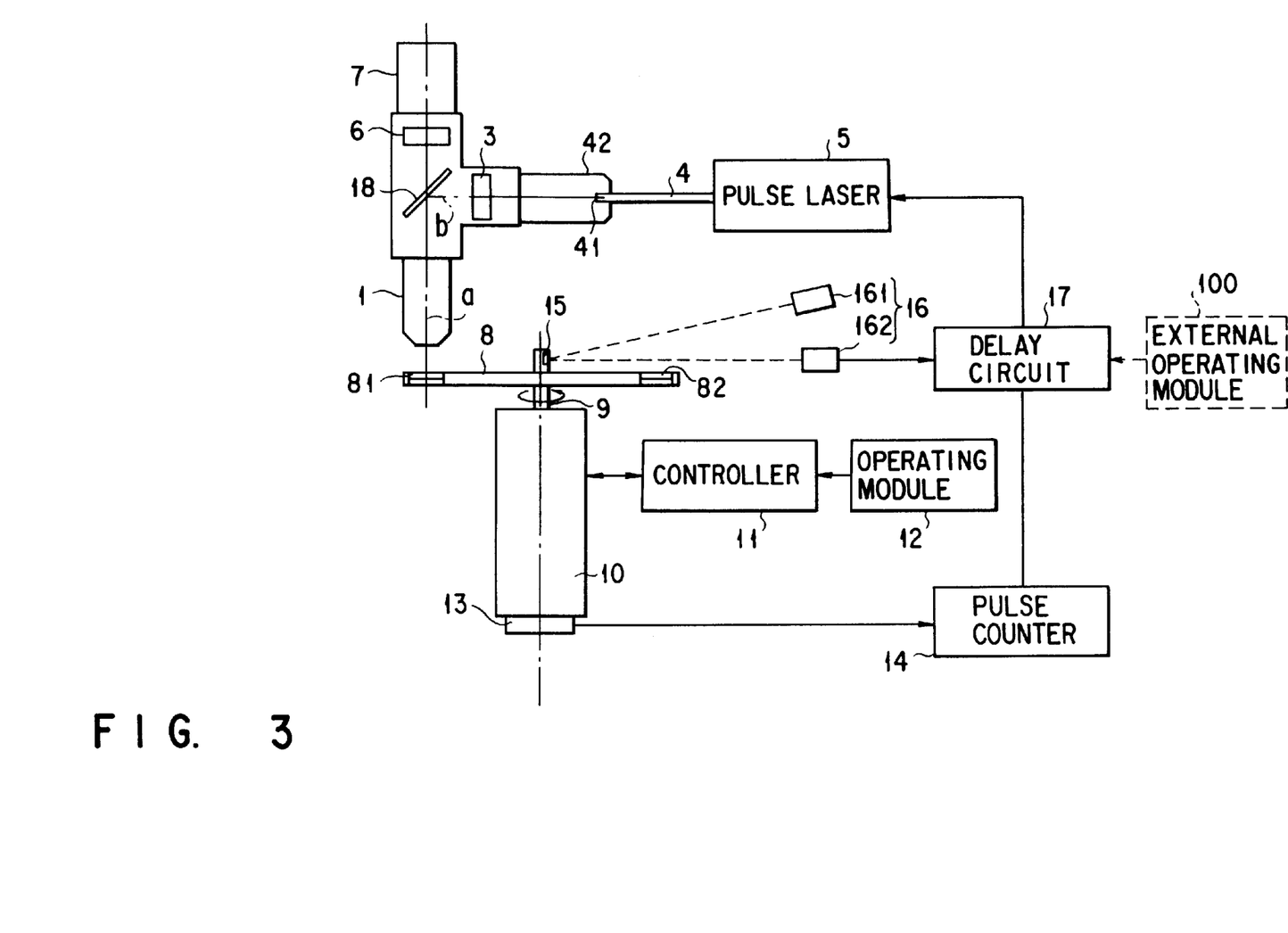
FIG. 3 is a diagram illustrating a configuration applied with an optical system for incident polarized light observation.

FIG. 3 is a diagram illustrating the configuration of the centrifuge microscope applied with an optical system for incident-light polarized light observation, also according to the first embodiment of the present invention. In FIG. 3, the same numerals are used for the portions that are the same as in FIG. 1. A centrifuge microscope of the present invention can be provided not only in the configuration of the transmission observation mode shown in FIG. 1 but also in the configuration of the incident-light observation mode shown in FIG. 3.

In FIG. 3, a half mirror 18 and an analyzer 6 are provided for incident-light illumination on the optical axis a of the objective lens 1 so that the half mirror 18, the polarizer 3, the beam expander 42, and the light outputting end 41 of the optical fiber 4 are arranged on the optical axis b, which is orthogonal to the optical axis a. And, the other end of the optical fiber 4 is connected with the pulsed laser 5. Accordingly, an optical system for incident polarized light observation is provided.

The disk 8 is arranged below the objective lens 1, and the sample chamber 81 crosses the optical axis a of the objective lens 1 according to the rotation of the disk 8. At the time the sample chamber 81 passes the optical axis a of the objective lens 1, the pulsed laser 5 emits a laser beam along the optical axis b in the direction of the polarizer 3 and the half mirror 18, that is, toward the optical system for incident polarized light observation system. The half mirror 18 can be replaced by double mirrors or a bake prism. The other configuration and operation of the centrifuge microscope are the same as those mentioned with reference to FIG. 1 and FIG. 2A to 2D.

According to the centrifuge microscope of the first embodiment, since the pulsed laser 5 capable of providing a pulse width sufficiently short as the pulse emission light source, a polarized light observation system comprising the polarizer 3 and the analyzer 6, specifically, a transmission polarized light observation system and an incident-light polarized light observation system can be achieved. Therefore, compared with a conventional configuration where parallel plates of a glass material are arranged between the objective lens and the rotor, deterioration of the polarizing characteristics at the time of polarized light observation can be eliminated. Therefore, for example, in the study of the cell division, a most preferable polarized light observation can be realized in observing the weakly birefringent sample of spindles otherwise obscured by the highly birefringent yolk of the egg cells. Besides, since a high output of the pulsed laser 5 is provided, a sufficient light amount can be ensured for the polarized light microscope observation.

Since the delay time Tb of the delay circuit 17 changes according to the change of the rotation speed of the disk 8, the emission timing of the pulsed laser 5 can be adjusted. Therefore, the emission timing of the pulsed laser 5 can be made coincident with the timing at which the sample chamber 81 passes the optical axis a between the objective lens 1 and the condenser lens 2 in the transmission polarized light observation system, or passes the optical axis a of the objective lens 1 in the incident polarized light observation system. Accordingly, the image blurring caused by the discord of the timings is avoided. That is, since the rotation speed of the disk 8 can be changed as desired, the microscope observation can be conducted at the optimum disk 8 rotation speed of the sample to provide the optimum centrifugal force or changing centrifugal force to be applied to the sample. Further, by setting the pulse width h of the pulse laser 5 according to the resolution of the objective lens 1 sought by the above-mentioned formula (3), the microscope observation can be conducted without deteriorating the resolution in the observation system.

As described hereinabove, according to the centrifuge microscope of the first embodiment, since the pulsed laser capable of providing a pulse width sufficiently short as the pulsed emission light source is used, a polarized light observation system having a polarizer and an analyzer can be achieved, as well as deterioration of the polarization characteristic in the polarized light observation can be eliminated.

Since a high output of the pulsed laser can be provided, a light amount sufficient for the polarized light microscope observation can be ensured. Besides, the emission timing of the pulsed laser can be made coincident with the timing at which the sample chamber passes the optical axis of the objective lens even if the rotation speed of the disk changes. Accordingly, a stable polarized light observation can be realized by the centrifuge microscope of this embodiment.

For example, when a mitotic is spindle surrounded by yolk granules in the egg cell is observed as the specimen, by using the centrifuge microscope of the present invention for observing the specimen while applying centrifugal force, the separation state of the yolk can be confirmed as well as separation of the yolk can be ensured by controlling the rotation speed of the disk, so as to drastically improve the percentage yield of spindles free of yolk granules. In addition, polarized light observation of the concentration and the molecular orientation of the microtubules that make up the spindle fibers or of the interacting force between the chromosomes and the microtubules can be achieved under high centrifugal force with high sensitivity and at high optical resolution. Furthermore, from polarized light observation of the spindles separated from yolk while changing the rotational speed of a disk 8, the force applied to the spindle or chromosomes at the time of cell division can be quantified. Furthermore, the molecular orientation and the fine structure of various colloid type industrial materials such as liquid crystals and emulsions under centrifugal field can be examined.

That is, the centrifuge microscopes of the present invention are not limited to the use in the field of biology, but can be used for polarized light observation in the fields of engineering and other technology related disciplines as well.

Figure 4A:
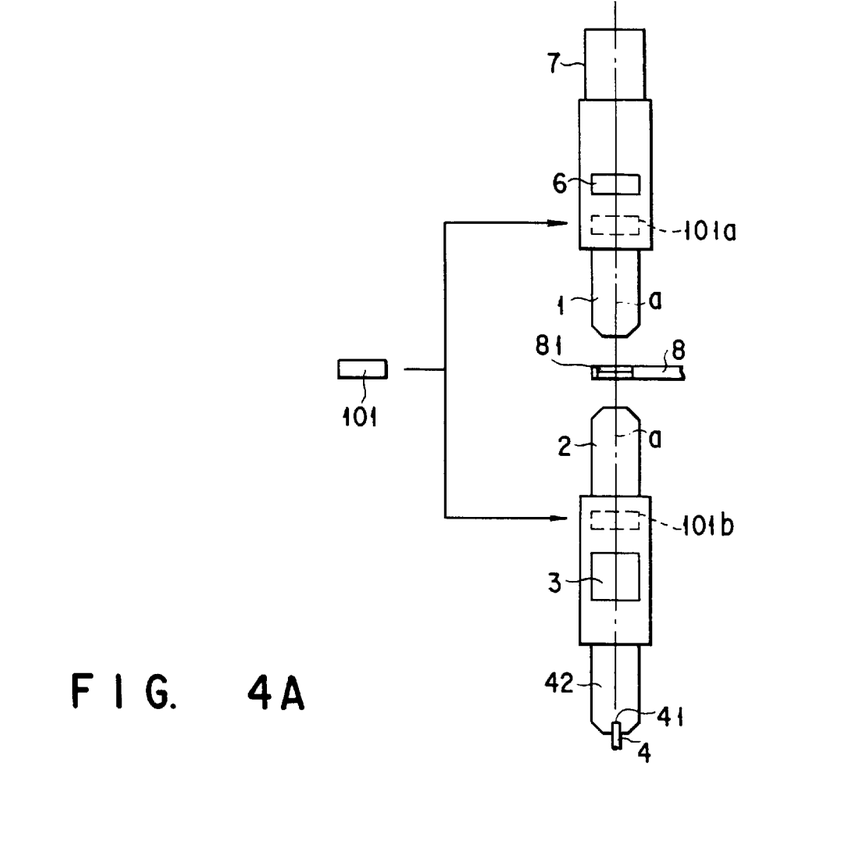
FIG. 4A is a diagram illustrating a main portion of the configuration of a centrifuge microscope of the second embodiment applied with an optical system for transmission polarized light observation of the present invention.

FIG. 4A is a diagram illustrating the main portion of the configuration of the centrifuge microscope equipped with an optical system for transmission polarized light observation of the second embodiment of the invention. The configuration of the centrifuge microscope includes compensators in addition to the configuration shown in FIG. 1. Since the portions other than the portion shown in FIG. 4A are the same as those of FIG. 1, they are not illustrated in FIG. 4A. In FIG. 4A, the same numerals are provided for the portions that are the same as in FIG. 1.

In FIG. 4A, a compensator 101 is inserted between the polarizer 3 and the analyzer 6. In this case, one compensator 101 is provided between the analyzer 6 and the objective lens 1 (shown as 101a), or is provided between the polarizer 3 and the condenser lens 2 (shown as 101b). Or two compensators 101 are inserted at both 101a and 101b.

Figure 4B:
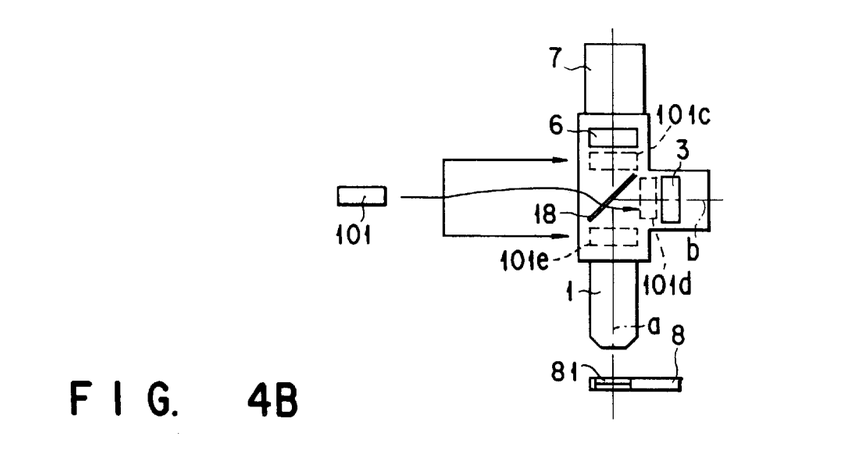
FIG. 4B is a diagram illustrating a main portion of the configuration of a centrifuge microscope of the second embodiment applied with an optical system for incident polarized light observation of the present invention.

FIG. 4B is also a diagram illustrating the main portion of the configuration of the centrifuge microscope applied with the optical system for incident polarized light observation of the second embodiment of the present invention. The configuration of the centrifuge microscope includes compensators in addition to the configuration shown in FIG. 3. Since the portions other than the portion shown in FIG. 4B are the same as those of FIG. 3, they are not illustrated in FIG. 4B. In FIG. 4B, the same numerals are provided for the portions that are the same as in FIG. 3.

In FIG. 4B, one compensator 101 is provided between the analyzer 6 and the half mirror 18 (shown as 101c), or between the polarizer 3 and the half mirror 18 (shown as 101d), or between the objective lens 1 and the half mirror 18 (shown as 101e). Or two compensators 101 are inserted at either of 101c, 101d and 101e. Or three compensators 101 are inserted at 101c, 101d and 101e. That is, one to three compensators 101 can be inserted.

As described hereinabove, according to the centrifuge microscope of the second embodiment, since compensators 101 can be inserted in the transmission polarized light observation system or the incident polarized light observation system, emphasis of the contrast in the observation of a fine birefringence tissue, or measurement of an anisotropic body in the Z' direction (which is the vibration direction of a light of a slower speed of the anisotropic body; commonly called the "γ direction" in the United States), as well as retardance measurements of a crystal, a fiber, an organism's tissue or of the birefringence induced by distortion can be achieved. A compensator is a birefringent phase plate capable of changing the retardation, and thus is used for the measurement of the retardances. A precise measurement of the retardances of the sample can be achieved by off-setting the retardation generated in the sample by the compensator and by reading out the calibrated compensator value.

Figure 5A:
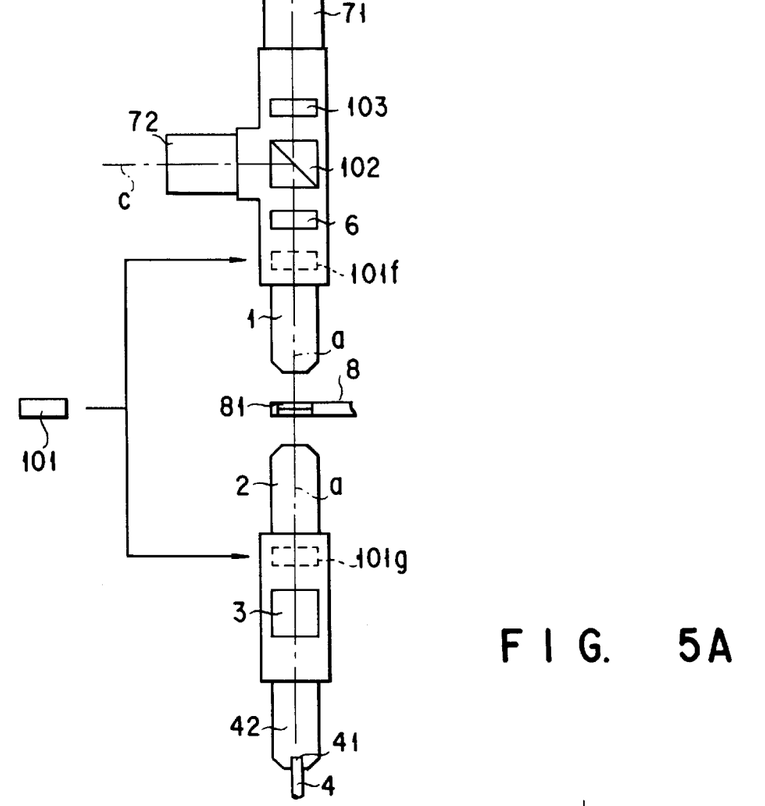
FIG. 5A is a diagram illustrating a main portion of the configuration of a centrifuge microscope of the third embodiment applied with an optical system for transmission polarized light observation of the present invention.

FIG. 5A is a diagram illustrating the main portion of the configuration of the centrifuge microscope applied with the optical system for transmission observation according to the third embodiment of the present invention. The centrifuge microscope is able to conduct polarized light observation and fluorescence observation at the same time. Since the portions other than the portion shown in FIG. 5A are the same as those of FIG. 1, they are not illustrated in FIG. 5A. In FIG. 5A, the same numerals are provided for the portions that are the same as in FIG. 1.

In FIG. 5A, an analyzer 6, a dichroic mirror 102, a barrier filter 103 and a CCD camera 71 for picking up the fluorescent image are arranged on the optical axis a of the objective lens 1. Furthermore, a CCD camera 72 for picking up the image observed in polarized light is provided on the optical axis c orthogonal to the optical axis a.

Simultaneous observation in polarized light and by fluorescence excitation can be realized by arranging a dichroic mirror 102 between the objective lens 1 and the CCD cameras 71, 72, which are the image pick-up elements as mentioned above. The dichroic mirror is a mirror, which reflects light of a certain wavelength (for polarized light observation) and transmits other wave length (for fluorescence observation). The barrier filter is a filter, which cuts out excitation wavelenghts from the light source, and selectively transmits the fluorescent image generated by the sample.

Major reasons for conducting polarized light observation include revelation of molecular orientation and the density of oriented molecules. That is, for example, in the division phase of live cells, movements of the mitotic spindles and its centrosomes, or polymerization and depolymerization of the microtubules that dynamically change with time, or the density of microtubules in the spindle fibers can be followed.

On the other hand, in the fluorescence mode, by using a fluorescent dyes label one can differentially label protein, nucleic acid, sugar, lipid, toxins, so that lipid film, cytoplasmic contents or nucleic acid can be selectively visualized. Specific fluorescent proteins, fluorescence changes associated with enzyme substrate interactions, or fluorescent latex beads can be incorporated as well.

By fluorescence observations, one can measure calcium concentrations in the cell, membrane potentials, observe shape changes of nucles and chromosomes, determine composition of DNA, measure enzyme activity, or visualize protein molecules of nm dimensions. By conducting the above-mentioned polarized light observation and fluorescence observation at the same time, characteristics of molecules in a living body such as response reaction with respect to input signal can be clarified.

It is also possible to insert the compensator 101 between the polarizer 3 and the analyzer 6 as shown in FIG. 5A. In this case, one compensator 101 is provided between the analyzer 6 and the objective lens 1 (shown as 101f), or is provided between the polarizer 3 and the condenser lens 2 (shown as 101g), or two compensators 101 are inserted at both 101f and 101g.

Figure 5B:
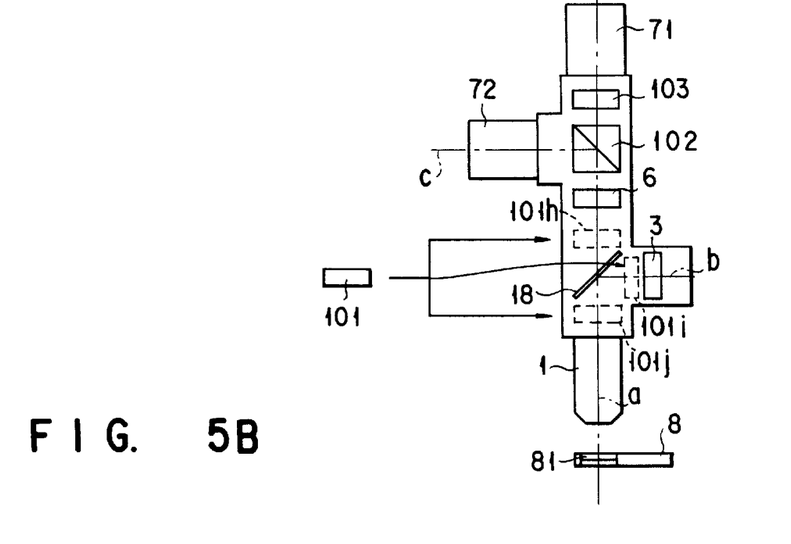
FIG. 5B is a diagram illustrating a main portion of the configuration of a centrifuge microscope of the third embodiment applied with an optical system for incident polarized light observation of the present invention.

FIG. 5B is a diagram illustrating the main portion of the configuration of the centrifuge microscope applied with the optical system for incident polarized light observation according to the third embodiment of the present invention. The configuration of the centrifuge microscope enables the polarized light observation and fluorescence observation at the same time. Since the portions other than the portion shown in FIG. 5B are the same as those of FIG. 3, they are not illustrated in FIG. 5B. In FIG. 5B, the same numerals are provided for the portions that are the same as in FIGS. 3 and 5A.

As shown in FIG. 5B, a half mirror 18, an analyzer 6, a dichroic mirror 102, a barrier filter 103 and a CCD camera 71 for picking up a fluorescent observed image are arranged on the optical axis a of the objective lens 1. A CCD camera 72 for picking up the image observed in polarized light is provided on the optical axis c orthogonal to the optical axis a. Moreover, the half mirror 18, a polarizer 3, and a pulse laser 5 are provided on the optical axis b orthogonal to the optical axis a.

In FIG. 5B, compensators can be provided as mentioned below. One compensator 101 is provided between the analyzer 6 and the half mirror 18 (shown as 101h), or between the polarizer 3 and the half mirror 18 (shown as 101i), or between the objective lens 1 and the half mirror 18 (shown as 101j). Or two compensators 101 are inserted at either two of 101h, 101i and 101j. Or three compensators 101 are inserted at 101h, 101i and 101j. That is, one to three compensators 101 can be inserted.

As heretofore mentioned, according to the centrifuge microscope of the third embodiment, by inserting a compensator 101 optionally to the configuration capable of polarized light observation and fluorescence observation at the same time in the transmission observation system or the incident-light observation system, the above-mentioned effects of polarized light observation and fluorescence observation can be achieved as well as the effects of the above-mentioned second embodiment can be realized.

Figure 6A:
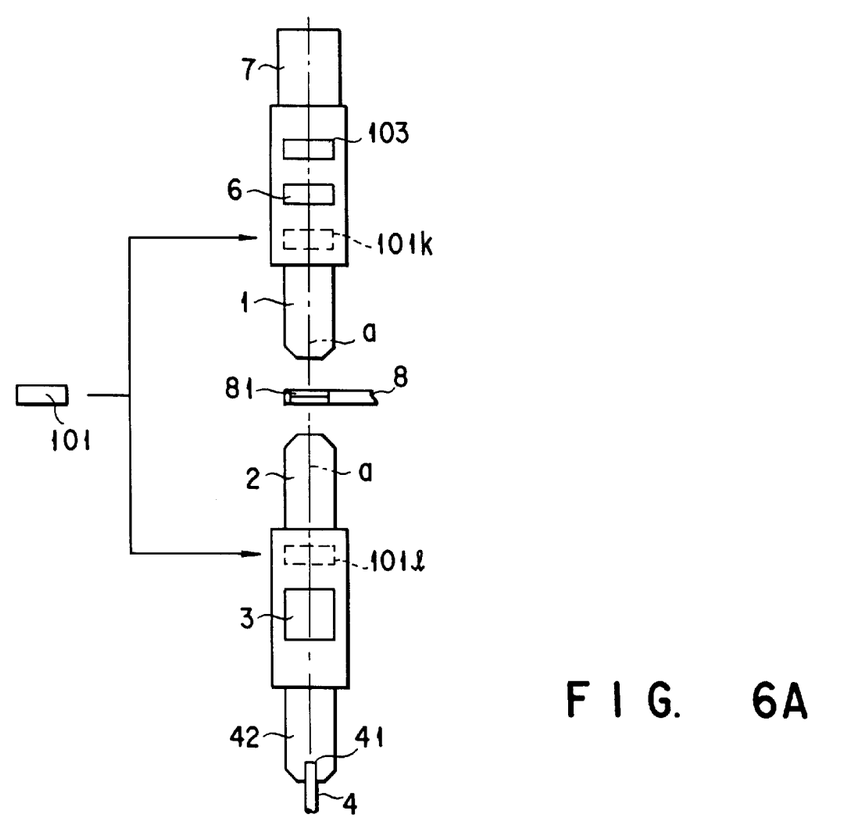
FIG. 6A is a diagram illustrating a main portion of the configuration of a centrifuge microscope of the fourth embodiment applied with an optical system for transmission polarized light observation of the present invention.

FIG. 6A is a diagram illustrating the main portion of the configuration of the centrifuge microscope applied with the optical system for transmitted light observation of the fourth embodiment of the present invention. The centrifuge microscope in this mode is able to conduct polarized fluorescence observations. Since the portions other than the portion shown in FIG. 6A are the same as those of FIG. 1, they are not illustrated in FIG. 6A. In FIG. 6A, the same numerals are provided for the same portions as in FIG. 1.

In FIG. 6A, an analyzer 6, a barrier filter 103 and a CCD camera 7 for picking up the polarized fluorescence image are arranged on the optical axis a of the objective lens 1. The polarized fluorescence observation can be realized by arranging the barrier filter 103 between the objective lens 1 and the CCD camera 7, which is the image pick-up element as mentioned above. By the polarized fluorescence observation method, the orientation of fluorescent molecules can be observed. That is, the behavior of the fluorescently tagged molecule can be observed and thus the application range of the centrifuge microscope can be widened. If the orientation of the same molecule is observed twice over a time internal, the rotational movement of the molecule is observed. In this way, various invaluable information such as the size of the molecule and the interaction among the molecules and the like can be obtained.

In FIG. 6A, it is also possible to insert a compensator 101 between the polarizer 3 and the analyzer 6. In this case, one compensator 101 is provided between the analyzer 6 and the objective lens 1 (shown as 101k), or is provided between the polarizer 3 and the condenser lens 2 (shown as 101l). Or two compensators 101 are inserted at both 101k and 101l.

Figure 6B:
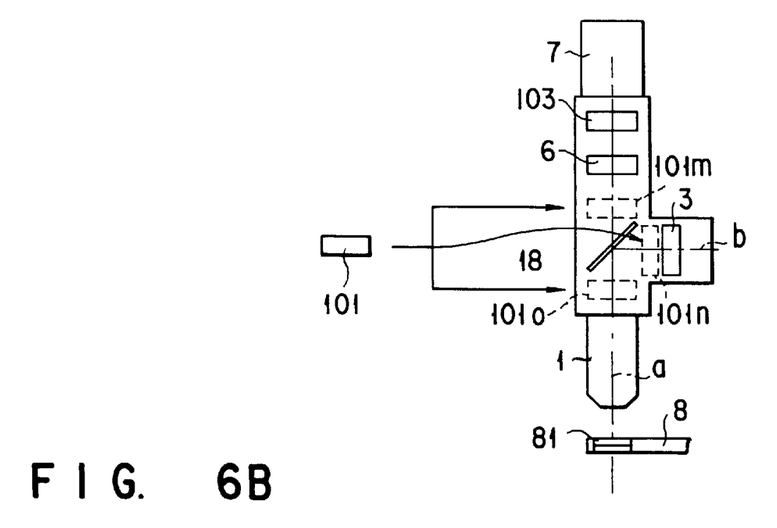
FIG. 6B is a diagram illustrating a main portion of the configuration of a centrifuge microscope of the fourth embodiment applied with an optical system for incident polarized light observation of the present invention.

FIG. 6B is also a diagram illustrating the main portion of the configuration of the centrifuge microscope equipped with an optical system for incident polarized light observation according to the fourth embodiment of the present invention. The configuration of the centrifuge microscope enables observation of polarized fluorescence. Since the portions other than the portion shown in FIG. 6B are the same as those of FIG. 3, they are not illustrated in FIG. 6B. In FIG. 6B, the same numerals are provided for the portions that are the same as in FIGS. 3 and 6A.

In FIG. 6B, a half mirror 18, an analyzer 6, a barrier filter 103 and a CCD camera 7 for picking up the fluorescence image are arranged on the optical axis a of the objective lens 1. The half mirror 18, a polarizer 3, and a pulsed laser 5 are provided on the optical axis b orthogonal to the optical axis a.

In FIG. 6B, compensators can be provided as mentioned below. One compensator 101 is provided (shown as 101m) between the analyzer 6 and the half mirror 18, or (shown as 101n) between the polarizer 3 and the half mirror 18, or (shown as 101o) between the objective lens 1 and the half mirror 18. Or two compensators 101 are inserted at either two of 101m, 101n and 101o. Or three compensators 101 are inserted at 101m, 101n and 101o. That is, one to three compensators 101 can be inserted.

According to the centrifuge microscope of the fourth embodiment, by inserting a compensator 101 optionally to the configuration capable of polarized fluorescence observation in the transmission observation system or the incident-light observation system, the above-mentioned effects of the polarized fluorescence observation can be achieved as well as the effects of the above-mentioned second embodiment can be realized.

Since a high power light source, namely, a pulsed laser is used in the centrifuge microscope of the present invention, not only can the simultaneous observation of the polarized light image and the fluorescence image shown in the third embodiment, and the polarized fluorescence observation shown in the fourth embodiment be realized, but also simultaneous observation of the polarized light observation and phase contrast observation, or polarized light observation method in combination with microscopy such as differential interference can be realized.

Although the position of the sample chamber 81 is detected by illminating a laser beam from the laser diode 161 to the mirror 15 and receiving the light reflected from the mirror 15 at the photo detector 162 in the position detecting portion 16 in the above-mentioned embodiments, other methods such as detecting the position of the sample chamber 81 by providing a transmission aperture at a certain position of the disk 8, directing a laser beam to the transmission aperture and detecting the transmitted laser beam can be applied as well.

In the centrifuge microscope of the above-mentioned embodiments, scanning or focusing of the sample can be conducted by moving the sample with respect to the optical axis a of the objective lens 1 mechanically or electrically.

Mechanical movement of the sample with respect to the optical axis of the objective lens 1 can be achieved by moving the image forming system including the objective lens 1 and the CCD camera 7, etc, and the illumination system including the condenser lens 2 and the beam expander 42, etc, together by a driving device (not illustrated) with the location of the motor 10 fixed. It is also possible to place the optical system on an XYZ stage independent from the motor and moving the XYZ stage by a driving device so as to allow scanning or focusing of the sample freely. It is also possible to move the motor 10, the rotation axis 9 and the disk 8 by a driving device (not illustrated) with the image forming system and the illumination system fixed.

Electrical movement of the sample with respect to the optical axis of the objective lens 1 can also be achieved by controlling the emission timing of the pulsed laser 5, so as to have the sample behave as if it slides along the rotation direction of the disk 8 to enable scanning of the sample in the peripheral direction of the disk 8. In this case, by intentionally changing the delay time Tb of the delay circuit 17 by the operating the external operating module 100, the observation position of the sample in the sample chamber 81 can slide along the rotation direction of the disk 8. Or by adjusting the operating module 12 to intentionally change the rotation speed of the motor 10, the observation position of the sample can slide similarly. Accordingly, observation of different positions of the sample can be conducted selectively. The above-mentioned function can be applied also for compensating the optical axis of the objective lens 1.

Additional advantages and modifications will readily occur to those skilled in the art. Therefore,5 the invention in its broader aspects is not limited to the specific details and representative embodiments, shown and described herein. Accordingly, various modifications may be made without departing from the spirit or scope of the general invention concept as defined by the appended claims and their equivalents.

We claim:

1. A centrifuge microscope comprising:

a rotation axis;

a disk which is mounted on said rotation axis and which is provided with a sample chamber for accommodating a sample;

a motor for driving the disk around the rotation axis;

an observation optical system including an objective lens which is positioned such that said sample chamber crosses an optical axis of said objective lens as said disk rotates, and a polarizer and an analyzer which are provided on the optical axis of said objective lens with said sample chamber interposed therebetween;

a pulsed laser source for emitting a pulsed laser to said sample along the optical axis of said objective lens at a timing at which said sample chamber crosses the optical axis of said objective lens;

adjusting means for adjusting an emission timing of said pulsed laser in accordance with a rotational speed of said disk, said adjusting means including a counter for determining the rotational speed of said disk, and a delay circuit for delaying the emission timing of said pulsed laser in accordance with the rotational speed determined by the counter;

a mirror provided on one of (i) the rotation axis and (ii) the disk, so as to face a given direction; and means for emitting a laser beam to the mirror and for receiving a reflected light from said mirror, so as to output to said delay circuit a pulse corresponding to a given position of said disk.

2. The centrifuge microscope according to claim 1, further comprising at least one compensator provided between the analyzer and the polarizer.

3. The centrifuge microscope according to claim 2, further comprising an image pick-up element for picking up an observed image of said sample, and a barrier filter provided between said objective lens and said image pick-up element.

4. A centrifuge microscope comprising:

a stable axis;

a disk which is mounted on the stable axis and which is provided with a sample chamber for accommodating a samples;

a motor for driving the disk around the stable axis;

an optical system for transmission observation, said optical system including an objective lens which is positioned such that said sample chamber crosses an optical axis of said objective lens as said disk rotates, and a polarizer and an analyzer which are provided on the optical axis of said objective lens with said sample chamber interposed therebetween; and a pulsed laser source for emitting a pulsed laser to said sample along the optical axis of said objective lens at a timing at which said sample chamber crosses the optical axis of said objective lens;

wherein said pulsed laser source sets a laser pulse width h (ns) so as to satisfy:

$$h \leq (0.61 \times \lambda/NA)/((2\pi R \times N/60)/1000000)$$

where NA is a numerical aperture of the objective lens, $\lambda$ is a laser wavelength, R (mm) is a rotational radius of the sample, and N (rpm) is a maximum rotation speed of the sample.

5. A centrifuge microscope comprising:

a rotation axis;

a disk which is mounted on said rotation axis and which is provided with a sample chamber for accommodating a sample;

a motor for driving the disk around the rotation axis;

an optical system for incident light observation, said optical system including an objective lens which is positioned such that said sample chamber crosses an optical axis of said objective lens as said disk rotates, a half mirror and an analyzer which are provided on the optical axis of said objective lens, and a polarizer which is provided on an axis orthogonal to said optical axis;

a pulsed laser source for emitting a pulsed laser to said sample along the optical axis of said objective lens at a timing at which said sample chamber crosses the optical axis of said objective lens;

adjusting means for adjusting an emission timing of said pulsed laser in accordance with a rotational speed of said disk, said adjusting means including a counter for determining the rotational speed of said disk, and a delay circuit for delaying the emission timing of said pulsed laser in accordance with the rotational speed determined by the counter;

a mirror provided on one of (i) the rotation axis and (ii) the disk, so as to face a given direction; and means for emitting a laser beam to the mirror and for receiving a reflected light from said mirror, so as to output to said delay circuit a pulse corresponding to a given position of said disk.

6. The centrifuge microscope according to claim 5, further comprising a compensator provided between said objective lens and said analyzer.

7. The centrifuge microscope according to claim 5, further comprising at least one compensator provided between said polarizer and said objective lens.

8. The centrifuge microscope according to claim 5, further comprising an image pick-up element for picking up an observed image of said sample, and a barrier filter provided between said objective lens and said image pick-up element.

9. A centrifuge microscope comprising:

a stable axis;

a disk which is mounted on the stable axis and which is provided with a sample chamber for accommodating a samples;

a motor for driving the disk around the stable axis;

an optical system for incident light observation, said optical system including an objective lens which is positioned such that said sample chamber crosses an optical axis of said objective lens as said disk rotates, a half mirror and an analyzer which are provided on the optical axis of said objective lens, and a polarizer which is provided on an axis orthogonal to said optical axis; and a pulsed laser source for emitting a pulsed laser to said sample along the optical axis of said objective lens at a timing at which said sample chamber crosses the optical axis of said objective lens;

wherein said pulsed laser source sets a laser pulse width h (ns) so as to satisfy:

$$h \leq (0.61 \times \lambda/NA)/((2\pi R \times N/60)/1000000)$$

where NA is a numerical aperture of the objective lens, $\lambda$ is a laser wavelength, R (mm) is a rotational radius of the sample, and N (rpm) is a the maximum rotation speed of the sample.

* * * * *